United States Patent [19]
Kobayashi

[11] Patent Number: 5,731,925
[45] Date of Patent: Mar. 24, 1998

[54] RECORDING AND/OR REPRODUCING APPARATUS HAVING TAPE PULL-OUT MEMBERS WITH MUTUALLY INTERSECTING MOVEMENT PATHS

[75] Inventor: Junji Kobayashi, Tokyo, Japan

[73] Assignee: Canon Kabushiki Kaisha, Tokyo, Japan

[21] Appl. No.: 781,468

[22] Filed: Jan. 10, 1997

Related U.S. Application Data

[63] Continuation of Ser. No. 326,325, Oct. 20, 1994, abandoned.

[30] Foreign Application Priority Data

Oct. 29, 1993 [JP] Japan ................. 5-294689

[51] Int. Cl.$^6$ ................. G11B 15/665; G11B 15/00
[52] U.S. Cl. ................. 360/85; 360/95
[58] Field of Search ................. 360/85, 95, 74.3

[56] References Cited

U.S. PATENT DOCUMENTS

| | | |
|---|---|---|
| 4,951,164 | 8/1990 | Yasaka et al. ............ 360/85 |
| 4,975,793 | 12/1990 | Oka ....................... 360/85 |
| 5,031,056 | 7/1991 | Okada et al. ............. 360/85 |
| 5,070,422 | 12/1991 | Sasaki et al. ............. 360/85 |
| 5,151,832 | 9/1992 | Nagasawa ................. 360/85 |
| 5,278,707 | 1/1994 | Tsuchiya et al. ........... 360/85 |

Primary Examiner—Stuart S. Levy
Assistant Examiner—Brian E. Miller
Attorney, Agent, or Firm—Robin, Blecker, Daley and Driscoll

[57] ABSTRACT

An apparatus arranged to pull out a tape stowed in a cassette and to cause the tape to abut on a head so as to enable the head to record or reproduce information on or from the tape includes a rotary drum on which the head is mounted, a first chassis on which the rotary drum is disposed, and a second chassis arranged to be relatively movable with respect to the first chassis and to have first and second pull-out members arranged thereon to pull out the tape from the cassette. At the beginning of loading the tape, the tape is pulled out from the cassette by the first pull-out member. Then, after the tape is pulled out a predetermined amount by the first pull-out member, the tape is further pulled out by the second pull-out member.

13 Claims, 6 Drawing Sheets

1

RECORDING AND/OR REPRODUCING APPARATUS HAVING TAPE PULL-OUT MEMBERS WITH MUTUALLY INTERSECTING MOVEMENT PATHS

This is a continuation application under 37 CFR 1.62 of prior application Ser. No. 08/326,325, filed Oct. 20, 1994, now abandoned.

BACKGROUND OF THE INVENTION

1. Field of the Invention

This invention relates to a tape loading device having a guide rail movable in loading a tape, for example, on a video cassette recorder (VCR).

2. Description of the Related Art

FIG. 1 shows by way of example the arrangement of the conventional tape loading device of the above-stated kind. The illustration includes a main chassis 1, a rotary drum 2 disposed on the main chassis 1, a fixed rail 3 set on the main chassis 1, a slide chassis 4 on which reel mounts, etc. (not shown) are mounted, a cassette 5 which is set on the slide chassis 4, and a magnetic tape 6 which is stowed in the cassette 5.

A post 7 is erected on a support lever 8. These parts 7 and 8 jointly constitute a tape pull-out guide. A post 9b is erected on a slider 9. The slider 9 is slidably engaged with a groove part 4f of the slide chassis 4. A first arm 10 and a second arm 11 are rotatably connected to each other. A slide gear 12 is rotatably supported on the main chassis 1.

In FIG. 1, the tape loading device is shown in a state obtained after completion of unloading the tape 6. In loading the tape 6, the slide chassis 4 abuts on the fixed rail 3 in such a way as to make the groove 4f of the slide chassis 4 match with a groove part 3a of the fixed rail 3. The groove parts 3a and 4f thus jointly constitute a guide part for the slider 9 in loading the tape 6.

The post 7 and the support lever 8, on the other hand, swing counterclockwise, as viewed on the drawing, in loading the tape 6. As apparent from the illustration, however, the moving path of the guide part and that of the tape pull-out guide are arranged not to come into a state of planar intersection, i.e., not allowed to cross each other on a plane. In other words, the moving path of the guide part which consists of the groove parts 3a and 4f is arranged to have nothing located there. This arrangement has been hindering a reduction in size of the apparatus.

SUMMARY OF THE INVENTION

This invention is directed to the solution of the above-stated problems of the conventional device. It is, therefore, an object of this invention to provide a tape loading device arranged to allow more latitude for arrangement of posts and to permit a reduction in size and thickness of the device, or to provide a recording and/or reproducing apparatus having the tape loading device.

To attain the object, a tape loading device arranged as an embodiment of this invention to pull out a tape stowed in a cassette and to cause the tape to abut on a head includes a first pull-out member arranged to pull out the tape from the cassette, a second pull-out member arranged to pull out the tape from the cassette and to cause the tape to abut on the head, and driving means arranged to cause the first pull-out member to pull out the tape from the cassette at the beginning of loading the tape, and to cause the second pull-out member to pull out the tape after the first pull-out member has pulled out the tape by a predetermined amount from the cassette.

Further, to attain the object from a different viewpoint, an apparatus arranged to pull out a tape stowed in a cassette and to cause the tape to abut on a head so as to enable the head to record or reproduce information on or from the tape includes a rotary drum on which the head is mounted, a first chassis on which the rotary drum is disposed, a second chassis arranged to be relatively movable with respect to the first chassis, a first pull-out member disposed on the second chassis and arranged to pull out the tape from the cassette, a second pull-out member disposed on the second chassis and arranged to pull out the tape from the cassette and to cause the tape to abut on the head, and driving means arranged to cause the first pull-out member to pull out the tape from the cassette at the beginning of loading the tape, and to cause the second pull-out member to pull out the tape after the first pull-out member has pulled out the tape by a predetermined amount from the cassette.

The above and other objects and features of this invention will become apparent from the following detailed description of an embodiment thereof taken in connection with the accompanying drawings.

DETAILED DESCRIPTION OF THE PREFERRED EMBODIMENT

Figure 1:
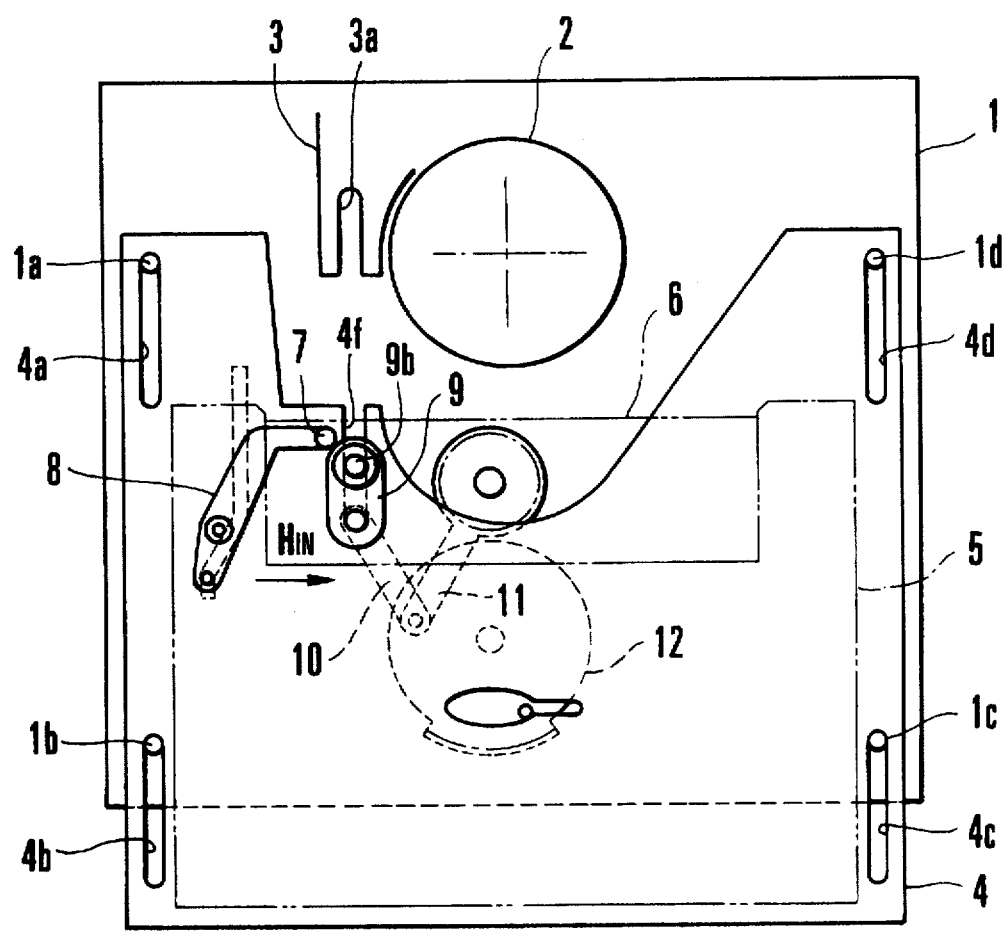
FIG. 1 is a plan view showing the conventional tape loading device in a state obtained when a tape is unloaded.

A tape loading device which is a preferred embodiment of this invention is described below with reference to FIGS. 2 to 6. In FIGS. 2 to 6, the same members as those of the conventional device shown in FIG. 1 are indicated by the same reference numerals.

Figure 2:
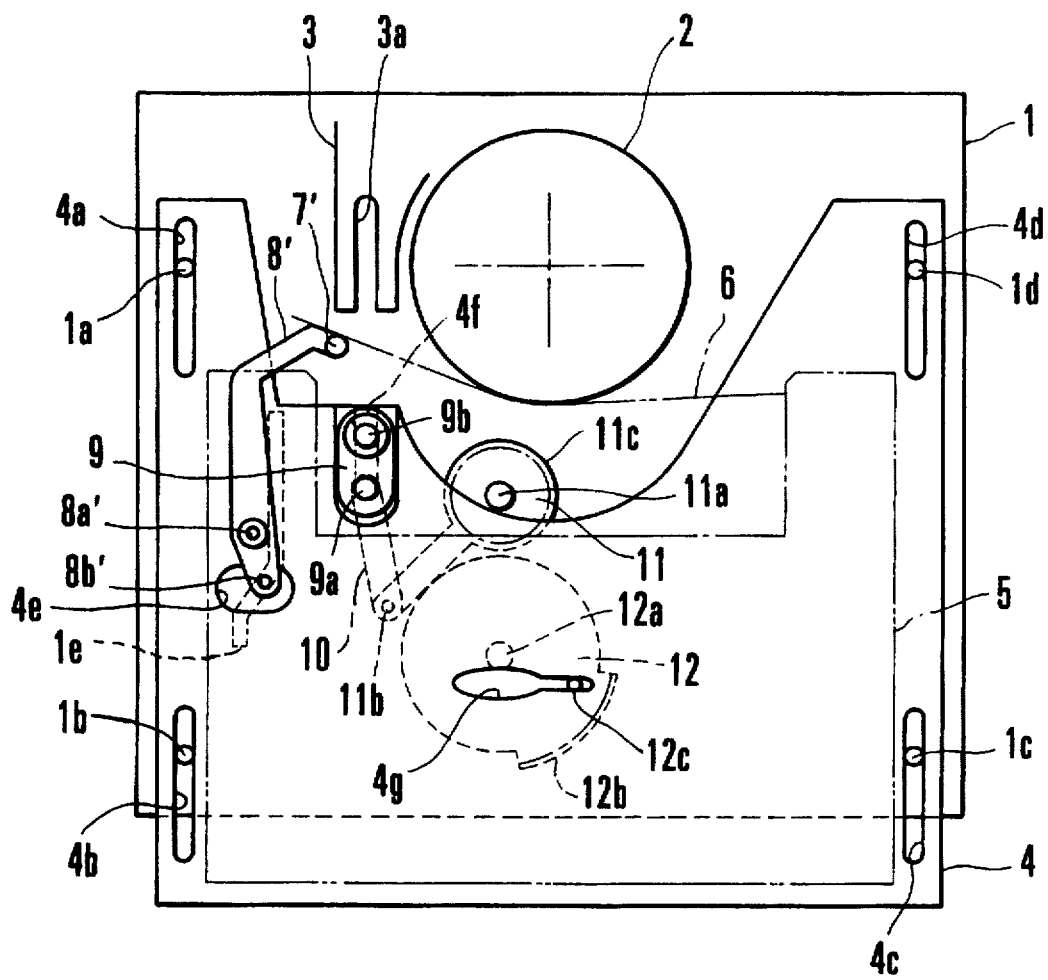
FIG. 2 is a plan view showing a tape loading device, which is an embodiment of this invention, in a state obtained at the beginning of loading the tape.
Figure 3:
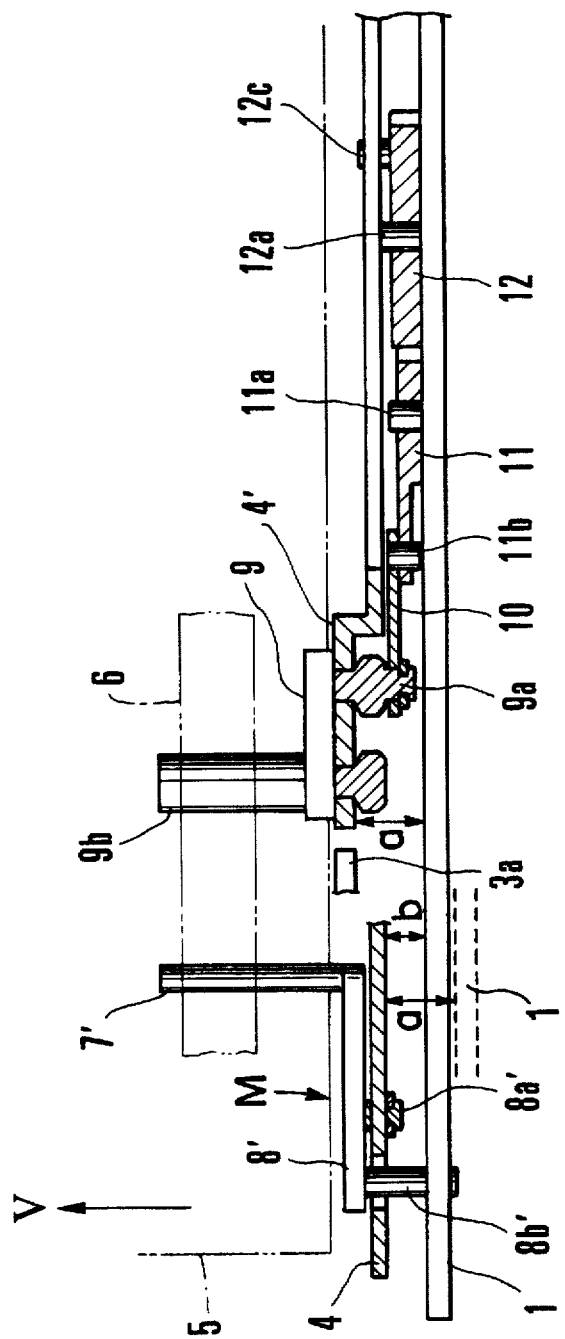
FIG. 3 is a sectional side view of the tape loading device which is the embodiment of this invention.

FIG. 2 is a plan view and FIG. 3 is a sectional side view, showing a feature of this embodiment. The illustrations include a main chassis 1, a rotary drum disposed on the main chassis 1, a fixed rail 3 set on the main chassis 1, and a slide chassis 4 arranged to mount thereon reel mounts, etc., which are not shown. Guide pins 1a to 1d arranged on the main chassis 1 are slidably fitted into slot parts 4a to 4d provided in the slide chassis 4. A cassette 5 is set on the slide chassis 4. A magnetic tape 6 is stowed in the cassette 5 with a part of the tape 6 exposed in a front part of the cassette 5.

A post 7' is erected on one end of a support lever 8'. These parts 7' and 8' jointly constitute a tape pull-out guide. The support lever 8' is rotatable on a support shaft 8a' set on the slide chassis 4. A pin 8b' is erected on the other end of the support lever 8 and pierces through a hole 4e of the slide chassis 4 to engage a slot 1e of the main chassis 1. One end of a brake band (not shown) which is wound around a reel mount is attached to the end of the support lever 8' at which the pin 8b' is provided. Tension of the tape 6 imparted by the post 7' is adjusted by means of the support lever 8' and the brake band. A post 9b is erected on a slider 9. The post 9b and the slider 9 jointly constitute a tape wrapping guide for wrapping the magnetic tape 6 around the rotary drum 2. The slider 9 is arranged to slidably engage a separated-type guide part consisting of a groove part 3a of the fixed rail 3' and a groove part 4f of the slide chassis 4.

A first arm 10 rotatably engages the slider 9 through a connection pin 9a. A second arm 11 has a toothed part 11c formed along its periphery. The second arm 11 is rotatably supported by a support shaft 11a on the main chassis 1. One end of the second arm 11 rotatably engages the first arm 10 through a connection pin 11b.

A slide gear 12 is rotatably supported by a support shaft 12a on the main chassis 1 and is arranged to be driven by a driving mechanism which is not shown. A toothed part 12b of the slide gear 12 is arranged to be capable of engaging the toothed part 11c of the second arm 11 at a part of its circumference. A slide pin 12c is erected on a peripheral part of the slide gear 12 in such a way as to engage a groove part 4g of the slide chassis 4. The groove part 4g of the slide chassis 4 is arranged such that, the center (support shaft 12a) of the slide gear 12 and the outer arc part of the groove part 4g with which the slide pin 12c comes into contact are arranged to become concentric with each other before and after the tape loading.

A peripheral part (a moving rail part 4') of the groove part 4f of the slide chassis 4 corresponding to the slider 9 is arranged, as Shown in FIG. 3, to be in a shape of being raised toward the cassette 5 from other parts of the slide chassis 4. In other words, the moving rail part 4' is arranged to be at about the same height a (in the direction of arrow V in FIG. 3) as the height of the support lever 8' from the chassis 1.

Also, shown in FIG. 3 is the lower facet M of the cassette 5 and the distance b between the slide chassis 4 and the main chassis 1. For comparison, the main chassis 1 of FIG. 1 is shown in dotted line and, if the slide chassis 4 of FIG. 3 were assumed to be the slide chassis 4 of FIG. 1, the main chassis 1 of FIG. 1 would also be at a distance a from its corresponding slide chassis 4, as is also shown.

Figure 4:
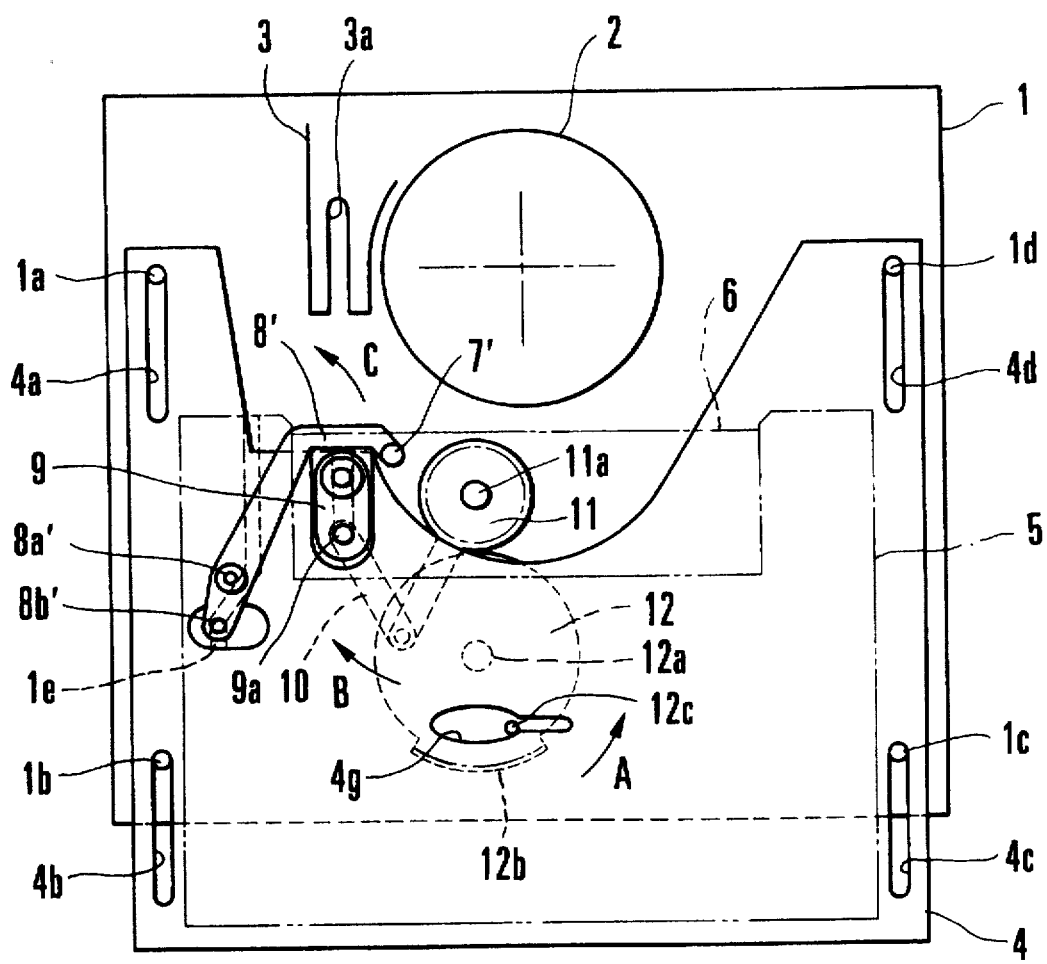
FIG. 4 is a plan view showing the tape loading device which is the embodiment of this invention in a state obtained in unloading the tape.

With the tape loading device arranged according to this invention as described above, the device operates as follows. FIG. 4 shows the tape loading device in an unloading state. In the unloading state, when the slide gear 12 rotates counterclockwise, i.e., in the direction of arrow A of FIG. 4, on the support shaft 12a, the slide pin 12c of the slide gear 12 pushes the slide chassis 4 through the groove part 4g. The slide chassis 4 is thus caused to move toward the rotary drum 2. The slider 9 then moves together with the slide chassis 4 in a state of being placed on the slide chassis 4. This movement causes the first arm 10 to move. As a result, the second arm 11 rotates on the support shaft 11a in the direction of arrow B in FIG. 4.

In the unloading state, as apparent from FIG. 4, the post 7' and the support lever 8' are located further inside the device than the slider 9. In other words, the groove part (guide part) 4f and the lever 8' are arranged to have their moving paths allowed to come into a state of planar intersection. The arrangement of having the post 7' and the support lever 8' disposed further inward than the slider 9 (see an arrow H$_{IN}$ in FIG. 1), the device can be effectively configured in a smaller size. Besides, in this case, the position in the direction of height of the slider 9 differs from that of the tape pull-out guide (the support lever 8'). In other words, as shown in FIG. 3, the slider 9 is disposed in a higher position (in the direction of arrow V) than the support lever 8'. The arrangement of allowing the moving paths of the guide part and the tape pull-out guide to come into a state of planar intersection thus causes no problem by virtue of this arrangement. This arrangement permits a reduction in thickness of the tape loading device.

The support lever 8' also moves along with the slide chassis 4. In that instance, the pin 8b' is guided and regulated by the groove part 1e of the main chassis 1. Therefore, the support lever 8' swings on the support shaft 8a' in the direction of arrow C in FIG. 4, and comes into the state shown in FIG. 2. This movement causes the post 7' and the rotary drum 2 respectively to abut on the magnetic tape 6. The magnetic tape 6 is then drawn out from a reel mount which is not shown.

Figure 5:
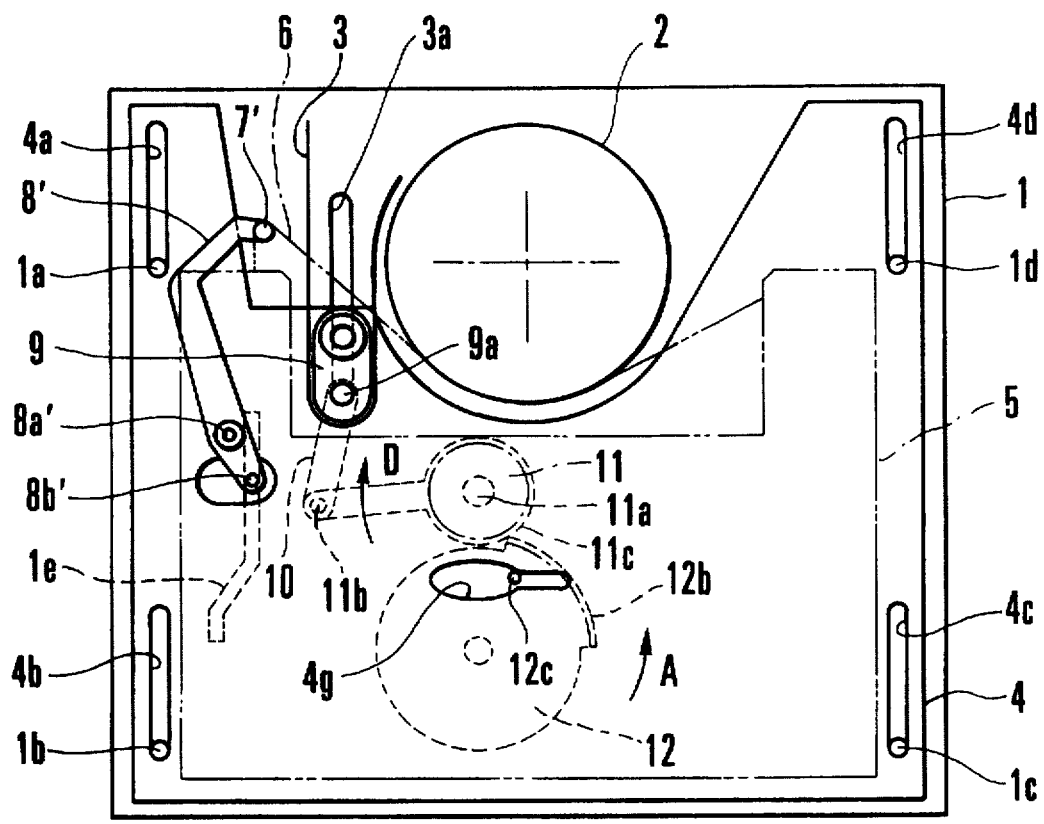
FIG. 5 is a plan view showing the tape loading device which is the embodiment of this invention in a state obtained in loading the tape.

The slide gear 12 rotates on the support shaft 12a further counterclockwise. As shown in FIG. 5, the slide pin 12c then comes to abut on the arc part of the groove part 4g. At the same time, the gear part 12b of the slide gear 12 begins to mesh with the toothed part 11c of the second arm 11. The moving rail part 4' of the slide chassis 4 then comes to abut on the fixed rail 3. The groove parts 3a and 4f of the fixed rail 3 and the slide chassis 4 are matched with each other to become continuous. The two guide parts which have been separated from each other are thus unified into one.

The slide gear 12 still further rotates counterclockwise. However, in this instance, the slide chassis 4 does not move any further since the slide pin 12c is abutting on the arc part of the groove part 4g of the slide chassis 4. The second arm 11 is caused to move clockwise by the intermeshing of the toothed part 11c of the second arm 11 and the toothed part 12b of the slide gear 12. The turning force of the second arm 11, in the direction of arrow D in FIG. 5, is transmitted to the slider 9 through the first arm 10. As a result, the position of the slider 9 shifts from the groove part 4f to the groove part 3a.

Figure 6:
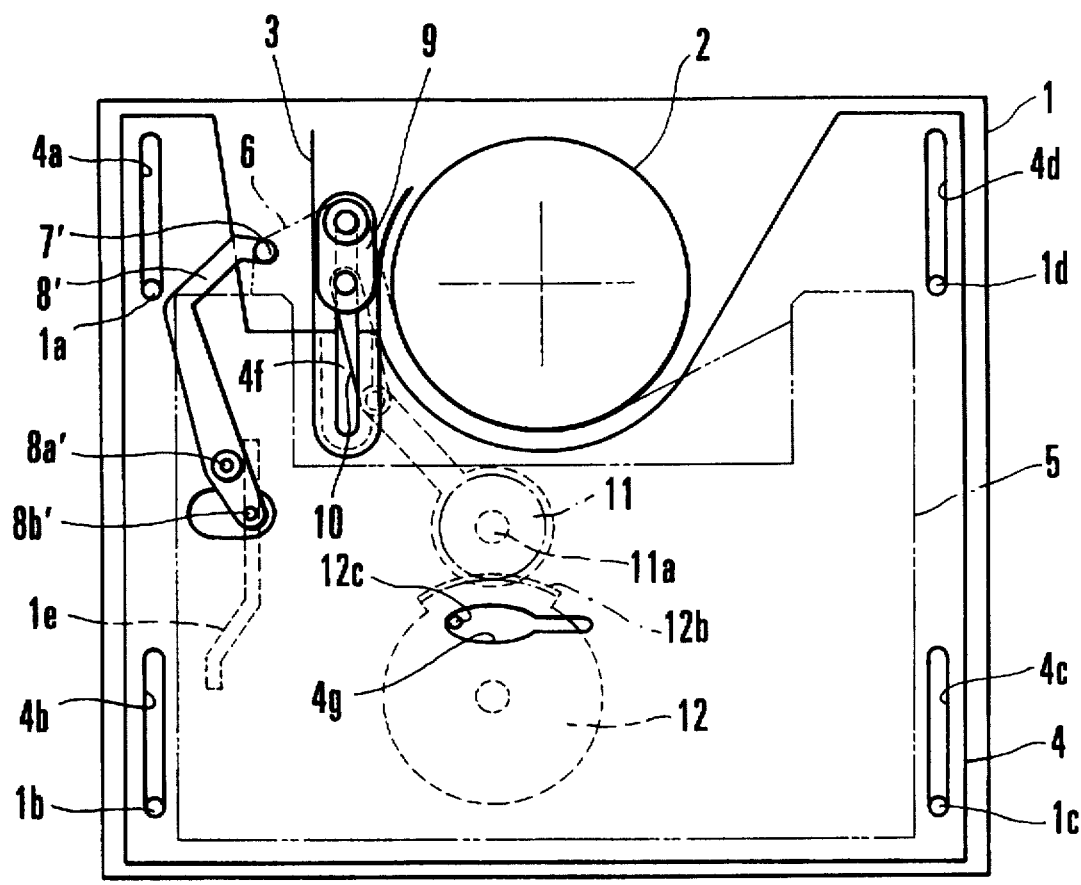
FIG. 6 is a plan view showing the tape loading device which is the embodiment of this invention in a state obtained upon completion of loading the tape.

Then, the tape loading comes to an end at the time when the slider 9 has pulled out the magnetic tape 6 from the cassette 5, as shown in FIG. 6.

In unloading the magnetic tape 6, the device operates as follows. Referring to FIG. 6, in this instance, the slide gear 12 rotates clockwise. The moving paths are traced reversely to the order in which actions are carried out in loading the magnetic tape 6 as described above. The state of FIG. 6 then shifts to the state of FIG. 4 through the state of FIG. 5 and the state of FIG. 2.

The timing of operation of the device of this embodiment can be set as follows. When the device is in a state of having the tape completely unloaded as shown in FIG. 4, the moving path of the guide part and that of the tape pull-out guide are secured in a planar intersecting state, i.e., has these paths crossing each other on a plane. When the tape loading begins, the tape pull-out guide is allowed to move. After the tape pull-out guide, the guide part is allowed to move. The arrangement of setting the operation timing of the device in this manner effectively contributes to a reduction in size of the system.

In the embodiment described above, the support lever 8' is set between the slide chassis 4 and the cassette 5. However, the support lever 8' may be set between the slide chassis 4 and the main chassis 1. In other words, the support lever 8' may be set on one side of the guide part (slide chassis 4) opposite to the cassette 5.

Further, the post 7' may be arranged to be a tension post.

According to the arrangement of the embodiment described above, a time difference is provided between the movement of the guide part and that of the tape pull-out guide. The positions of the guide part and the tape pull-out guide are set in such a manner that the loci of them intersect each other in their planar and height relations. This arrangement gives more latitude in disposing the various posts and thus eventually permits a reduction in size and thickness of the mechanism of the device.

What is claimed is:

1. A tape loading device for pulling out a tape stowed in a cassette and causing the tape to be loaded on a drum, comprising:
   a) a first pull-out member arranged to pull out the tape from the cassette, said first pull-out member including a lever and a post mounted on the lever;
   b) a second pull-out member arranged to pull out the tape from the cassette and to cause the tape to become loaded on said drum, the lever of said first pull-out member arranged to intersect a moving path of said second pull-out member;
   c) driving means arranged to permit said first pull-out member to pull out the tape from the cassette at the beginning of loading the tape, and which allows said second pull-out member to further pull out the tape from the cassette after said first pull-out member has pulled out the tape from the cassette by a predetermined amount;
   d) a first chassis having a first guiding part for guiding said second pull-out member; and
   e) a second chassis supported in said device to be movable with respect to said first chassis and having said first and second pull-out members disposed thereon, and having second guiding part for guiding said second pull-out member, said first guiding part and said second guiding part being separately disposed from each other before said second chassis begins to move in the direction in which said second guiding part approaches said first guiding part, and being unified into one guiding part after said second chassis has completed to move in the direction in which said second guiding part approaches said first guiding part;
      said second guiding part being disposed in the direction of thickness of a cassette at a position the same as or higher than the position of said first pull-out member; and
      said first pull-out member beginning to take an action of passing through between said first guiding part and said second guiding part, before said second pull-out member begins to move.

2. A device according to claim 1, wherein said second chassis is arranged to stop moving toward said rotary drum, after said first pull-out member has intersected the moving path of said second pull-out member.

3. A device according to claim 2, wherein said second pull-out member is arranged to move along said guide part after said second chassis has stopped moving toward said rotary drum.

4. A device according to claim 1, wherein said first chassis has moving means for causing said second pull-out member to move, said moving means being included in said driving means.

5. A device according to claim 4, wherein said first chassis has further moving means for moving said second chassis, said further moving means being arranged to cause first-mentioned moving means to operate.

6. A device according to claim 4, wherein said first chassis has a guide groove for guiding said first pull-out member.

7. An apparatus arranged to pull out a tape stowed in a cassette and to cause the tape to be loaded on a drum so as to enable the apparatus to record or reproduce information on or from the tape, comprising:
   a) a rotary drum;
   b) a first chassis on which said rotary drum is disposed;
   c) a second chassis supported in said apparatus to be movable with respect to said first chassis;
   d) a first pull-out member disposed on said second chassis and arranged to pull out the tape from the cassette, said first pull-out member including a lever and a mounted on the lever;
   e) a second pull-out member disposed on said second chassis and arranged to pull out the tape from the cassette and to cause the tape to become loaded on said rotary drum, the lever of said first pull-out member arranged to intersect a moving path of said second pull-out member;
   f) driving means arranged to permit said first pull-out member to pull out the tape from the cassette at the beginning of loading the tape, and which allows said second pull-out member to further pull out the tape from the cassette after said first pull-out member has pulled out the tape from the cassette by a predetermined amount;
   g) said first chassis having a first guiding part for guiding said second pull-out member;
   h) said second chassis having said first and second pull-out members disposed thereon, and having a second guiding part for guiding said second pull-out member, said first guiding part and said second guiding part being separately disposed from each other before said second chassis begins to move in the direction in which said second guiding part approaches said first guiding part, and being unified into one guiding part after said second chassis has completed to move in the direction in which said second guiding part approaches said first guiding part;
      said second guiding part being disposed in the direction of thickness of a cassette at a position the same as or higher than the position of said first pull-out member; and
      said first pull-out member beginning to take an action of passing through between said first guiding part and said second guiding part, before said second pull-out member begins to move.

8. An apparatus according to claim 7, wherein said second chassis is arranged to stop moving toward said rotary drum after said first pull-out member has intersected the moving path of said second pull-out member.

9. An apparatus according to claim 8, wherein said second pull-out member is arranged to move along said guide part after said second chassis has stopped moving toward said rotary drum.

10. An apparatus according to claim 7, wherein said first chassis has moving means for causing said second pull-out member to move, said moving means being included in said driving means.

11. An apparatus according to claim 10, wherein said first chassis has further moving means for moving said second chassis, said further moving means being arranged to cause the first-mentioned moving means to operate.

12. An apparatus according to claim 10, wherein said first chassis has a guide groove for guiding said first pull-out member.

13. An apparatus according to claim 7, wherein said first pull-out member is a tension adjusting member arranged to adjust the tension of the tape.

* * * * *

UNITED STATES PATENT AND TRADEMARK OFFICE
CERTIFICATE OF CORRECTION

PATENT NO. : 5,731,925
DATED : March 24, 1998
INVENTOR(S) : Kobayashi, Junji

It is certified that error appears in the above-identified patent and that said Letters Patent is hereby corrected as shown below:

Col. 3, line 7, delete "rail 3' " and insert -- rail 3 --.

Col. 3, line 30, delete "Shown" and insert -- shown --.

Col. 6, line 9, delete "a mounted" and insert -- a post mounted --.

Signed and Sealed this

First Day of September, 1998

Attest:

BRUCE LEHMAN

Attesting Officer

Commissioner of Patents and Trademarks